(12) United States Patent
John

(10) Patent No.: US 9,915,215 B2
(45) Date of Patent: Mar. 13, 2018

(54) FUEL INJECTOR FOR PULSED INJECTIONS AND SYSTEM AND METHOD THEREOF

(71) Applicant: Caterpillar Inc., Peoria, IL (US)

(72) Inventor: Bobby John, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 43 days.

(21) Appl. No.: 15/141,334

(22) Filed: Apr. 28, 2016

(65) Prior Publication Data

US 2017/0314491 A1 Nov. 2, 2017

(51) Int. Cl.
*F02M 61/18* (2006.01)
*F02D 41/20* (2006.01)
*F02M 63/00* (2006.01)

(52) U.S. Cl.
CPC ........... *F02D 41/20* (2013.01); *F02M 61/182* (2013.01); *F02M 61/1806* (2013.01); *F02M 61/1813* (2013.01); *F02M 63/0043* (2013.01); *F02M 63/0054* (2013.01); *F02D 2041/202* (2013.01)

(58) Field of Classification Search
CPC ........... F02M 61/1806; F02M 61/1813; F02M 61/182
USPC ..................................... 123/305; 239/533.12
See application file for complete search history.

(56) References Cited

U.S. PATENT DOCUMENTS

| | | | |
|---|---|---|---|
| 4,151,958 A * | 5/1979 | Hofmann | F02M 45/08 239/533.3 |
| 6,213,089 B1 | 4/2001 | Cheng | |
| 6,467,702 B1 | 10/2002 | Lambert et al. | |
| 7,225,791 B2 | 6/2007 | Blessing et al. | |
| 7,438,840 B2 | 10/2008 | Ickinger | |
| 9,068,539 B2 | 6/2015 | Coldren | |
| 2005/0098144 A1* | 5/2005 | Stewart | F02B 1/12 123/299 |
| 2007/0108317 A1* | 5/2007 | Boecking | F02M 45/086 239/533.12 |
| 2010/0133361 A1* | 6/2010 | Futonagane | F02M 45/086 239/533.12 |
| 2014/0048036 A1 | 2/2014 | Zoeller et al. | |
| 2015/0211464 A1* | 7/2015 | Ishida | F02M 21/0263 239/5 |
| 2016/0215745 A1* | 7/2016 | Koeninger | F02M 61/1893 |

FOREIGN PATENT DOCUMENTS

| | | |
|---|---|---|
| EP | 1 249 600 B1 | 6/2006 |
| WO | WO 2009/067495 A2 | 5/2009 |
| WO | WO 2015/053101 A1 | 4/2015 |

* cited by examiner

*Primary Examiner* — Erick Solis
(74) *Attorney, Agent, or Firm* — Oblon, McClelland, Maier & Neustadt

(57) ABSTRACT

A fuel injection system is provided. The fuel injection system can have a fuel injector having a check valve with a plurality of fuel output ports, and a fuel injector body with an outer surface and an inner surface. The fuel injector body defines an inner volume to accommodate bi-directional movement of the check valve. The fuel injector body includes at least a first row of injection ports and a second row of injection ports extending from the inner surface to the outer surface. The check valve is bi-directionally controllable in the inner volume, during a single cycle, to output from the fuel injector body any one of a plurality of predefined pulse injection patterns.

9 Claims, 8 Drawing Sheets

FUEL INJECTOR FOR PULSED INJECTIONS AND SYSTEM AND METHOD THEREOF

TECHNICAL FIELD

The present disclosure relates to a fuel injector, and more particularly relates to a fuel injector for providing defined, short and repeatable pulsed injections in an internal combustion engine, and systems and methods thereof.

BACKGROUND

A fuel injector is used in an internal combustion engine, such as a compression ignition engine, to deliver or inject pressurized combustible fuel to a combustion chamber of the engine. Typically, fuel injectors include a fuel injector body and a valve, sometimes called a check, a check valve, a needle, or a needle valve, which can be movably disposed in the fuel injector body. The valve and fuel injector body may form a converging space at a discharging end of the fuel injector body, generally referred to as nozzle. In a closed position, the needle valve seals against the nozzle to prevent pressurized injection of combustible fuel from the nozzle of the fuel injector body. Conversely, in an open position, the valve can be lifted to inject the pressurized combustible fuel from the nozzle.

For some fuel injectors where the valve lifts to start injection and closes to stop injection, undesirable pulse injection control may result, for instance, with respect to pulse shape, duration and interval. Also, for some fuel injectors residual fuel in a volume between the valve and nozzle can create inconsistencies in the volume of fuel output by the nozzle.

U.S. Pat. No. 6,467,702, hereinafter referred to as '702 patent, describes a fuel injector, for instance, with reference to FIGS. 13-16, whereby a valve needle may be lifted from a state where fuel injection does not occur through either first outlet openings or second outlet openings to a second fuel injecting position where fuel injection occurs through only the second outlet openings. According to the '702 patent, from the second fuel injecting position the valve needle may be either returned to the state where fuel injection does not occur through either first outlet openings or second outlet openings or further lifted to a first fuel injecting position where fuel injection occurs through only the first outlet openings.

SUMMARY

In one or more embodiments of the disclosed subject matter, a fuel injector is provided. The fuel injector includes a fuel injector body defining an inner volume and having a plurality of rows of injection ports, including a first row of injection ports and a second row of injection ports below the first row of injection ports. Each of the injection ports has an inlet and an outlet. The fuel injector also includes a check valve having one or more fuel inlet ports to receive fuel and a plurality of fuel output ports to output fuel to one of the first row of injection ports and the second row of injection ports. The fuel output ports of the check valve are arranged at a same horizontal plane. The check valve is configured to move, during a single predetermined fuel injection cycle, from an initial position in the inner volume where fuel output ports of the check are above the first row of injection ports of the fuel injector body and no fuel is output from the injection ports of the fuel injector body, downward in the inner volume to a second position where the injection ports of the first row are aligned with the output ports of the check such that fuel from the check is output at a first spray angle from the outlets of the injection ports of the first row of injection ports. The check valve is further configured to move, during the single predetermined fuel injection cycle, from the second position either upward in the inner volume to the initial position or downward in the inner volume to a third position where the fuel output ports of the check are between the first and second rows of injection ports of the fuel injector body and no fuel is output from the injection ports of the fuel injector body. The check valve is further configured to move, during the single predetermined fuel injection cycle, from the third position downward in the inner volume to a fourth position where the fuel output ports of the check are aligned with the injection ports of the second row of injection ports such that fuel from the check is output at a second spray angle from the outlets of the injection ports of the second row of injection ports. The check valve is controllable to move between at least the initial position, the second position, the third position, and the fourth position bi-directionally during the single predetermined fuel injection cycle. The speed of the check is variable between at least the initial position, the second position, the third position, and the fourth position to create a predetermined pattern of pulse injections with pre-defined pulse duration, rate shape, and intervals between pulses.

According to one or more embodiments of the disclosed subject matter, a fuel injection system is provided. The fuel injection system includes a bi-directional valve having a plurality of fuel output openings. The fuel injection system also includes a fuel injection body having an outer surface and an inner surface that defines a cavity to accommodate bi-directional movement of the valve. The fuel injection body includes a first row of openings extending from the inner surface to the outer surface, and a second row of openings extending from the inner surface to the outer surface. The bi-directional valve is controllable such that the speed thereof changes from a first speed to a second speed after initial alignment of the plurality of fuel output openings with one of the first row of openings and the second row of openings of the fuel injection body to control, according to a predefined pulse pattern, one or more of a rate shape of an injection pulse output from the fuel injection body and an interval between adjacent pulses.

One or more embodiments of the disclosed subject matter involve a method of injecting fuel during a single predetermined fuel injection cycle according to any one of a plurality of predefined pulse injection patterns. The method includes providing a fuel injector body and a check valve. The fuel injector body includes a first set of openings and a second set of openings. The check valve includes a plurality of fuel output ports to output fuel to the openings of the fuel injector body. The method further includes moving the check valve relative to the fuel injector body up and down in the single predetermined fuel injection cycle, and at different speeds, to selectively inject fuel from one or more of the first set of openings and the second set of openings in correspondence with a first predefined pulse injection pattern of the plurality of predefined pulse injection patterns.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments of the present disclosure and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure relate to a fuel injector, a fuel injection system having the fuel injector and method of controlling the fuel injector to provide any of a plurality of predetermined, defined and repeatable pulse injection patterns. Generally speaking, pulse injection patterns can be set or commanded to optimize emission and fuel consumption, for instance.

Figure 1:
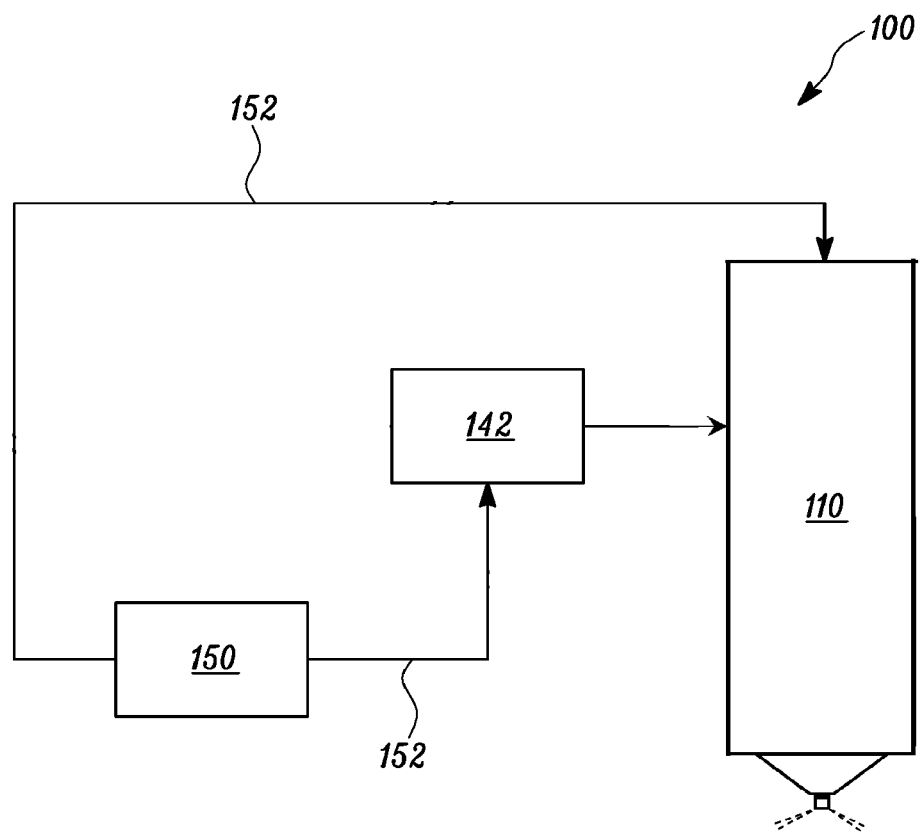
FIG. 1 illustrates a schematic block diagram of a fuel injection system in accordance with one or more embodiments of the present disclosure.

FIG. 1 illustrates a schematic diagram of a fuel injection system 100, according to one or more embodiments of the disclosed subject matter, in which functions or operations according to the present disclosure may be implemented or performed. The fuel injection system 100 may be associated with a machine (not shown) configured to perform operations, for instance, relative to mining, construction, farming, transportation, power generation, or any other work associated with a particular industry. In some examples, the machine may be a mobile machine, such as a mining truck, an off-highway truck, a dozer, a backhoe, an excavator, a motor grader, or any other earth moving machine. The machine may alternatively be a stationary machine including, but not limited to, a stationary generator set, pumping mechanism, or other suitable operation-performing machine.

The fuel injection system 100 includes a fuel injector 110 configured to deliver (i.e., inject) fuel to an engine (not shown) of the machine, such as a gasoline engine, a diesel engine, or a dual-fuel engine, so that the fuel is combusted in the engine for powering the machine. In some examples, the fuel injection system 100 may include multiple fuel injectors; however, for illustration purposes, only one fuel injector 110 is shown in FIG. 1. In general, a number of the fuel injectors 110 in the fuel injection system 100 may be equal to a number of cylinders in the engine. Fuel injection system 100 can also include a fuel supply system 142, which may include a fuel tank (or tanks) to store liquid fuel and a fuel pump, to supply fuel from the fuel tank to an engine via the fuel injector 110, and control circuitry 150. Generally speaking, the control circuitry 150 (e.g., which may include an Electronic Control Unit (ECU)) can send a control signal or signals via one or more communication lines 152 to the fuel supply system to provide pressurized fuel to the fuel injector 110, and the control circuitry 150 can send a control signal or signals via one or more communication lines 152 to the fuel injector 110 to cause the fuel injector 110 to output pressurized fuel according to any of a plurality of predetermined, defined and repeatable pulse injection patterns. As will be discussed in more detail below, the fuel can be always under pressure when supplied to the fuel injector 110, and the fuel is delivered when fuel output ports of a movable valve of the fuel injector line up with (fully or partially) one or more injection ports of a fuel injector body of the fuel injector 110.

Figure 2:
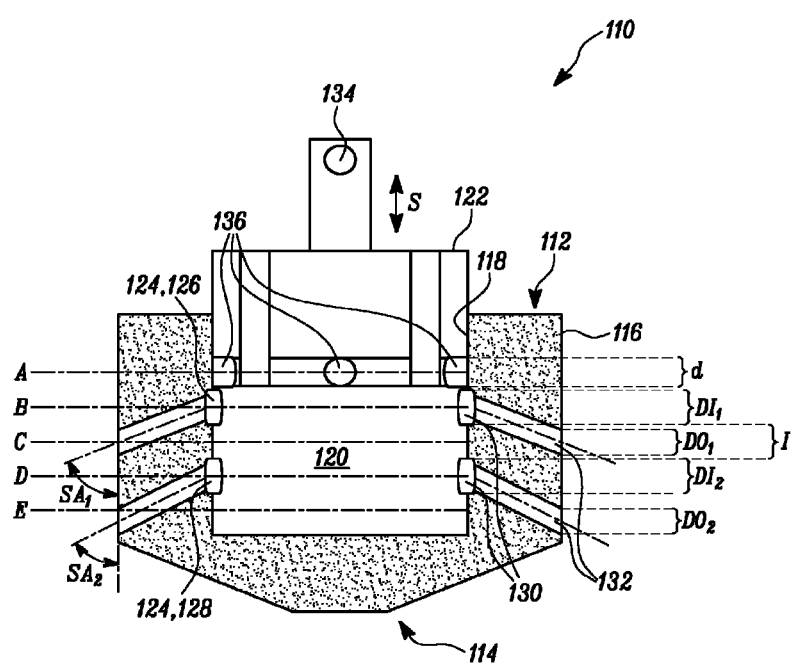
FIG. 2 illustrates a diagrammatic sectional view of a portion of a fuel injector according to one or more embodiments of the disclosed subject matter with a movable valve at a first position, which may be an initial position.

FIG. 2 illustrates a diagrammatic cross-sectional view of the fuel injector 110. As illustrated in FIG. 2, the fuel injector 110 includes a fuel injector body 112 having a nozzle region 114. The fuel injector body 112 includes an outer surface 116 and an inner surface 118. It may be seen that the inner surface 118 can form a cavity defining an inner volume 120 in the fuel injector body 112. The fuel injector 110 also includes a movable valve 122, which may be referred to or interpreted as a bidirectional movable valve. Also, movable valve 122 may be called or interpreted as a check valve, a check, a needle, a needle valve that is movable in two opposing directions (i.e., bidirectional). The movable valve 122 can be accommodated in at least a portion of the inner volume 120 of the fuel injector body 112. Further, the inner volume 120 can allow or facilitate bi-directional movement of the movable valve 122, up and down, for instance, in the fuel injector body 112.

As illustrated in FIG. 2, the fuel injector body 112 has a plurality of injection ports, which are individually or collectively referenced by the numeral 124, in the nozzle region 114. In one example, the injection ports 124 are arranged in a plurality of rows in the nozzle region 114. In FIG. 2, for instance, the fuel injector 110 has two rows of the injection ports 124 arranged in different horizontal planes (i.e., one above another). That is, the fuel injector 110 includes a first row 126 of injection ports 124, and a second row 128 of injection ports 124 located below the first row 126 of injection ports 124. The injection ports 124 extend from the inner surface 118 to the outer surface 116 of the fuel injector body 112. Further, each of the injection ports 124 has an inlet 130 at the inner surface 118 and an outlet 132 at the outer surface 116 of the fuel injector body 112. Inlets 130 of the first row 126 of injection ports 124 and inlets 130 of the second row 128 of injection ports 124 can be separated by a distance 'I,' which can be set and factored into a time interval between pulses associated with the first and second rows of injection ports for predefined pulse injection patterns according to various embodiments of the disclosed subject matter.

As noted above, the number of rows of injection ports 124 shown in FIG. 2 is merely an example, and more than two rows of injection ports may be provided, such as three or four. Also, a total number of injection ports 124 in each row may be the same or different. For example, row 126 may have four injection ports 124 and row 128 may have four, eight, or twelve injection ports 124 or vice versa. Also, in an embodiment with three or more rows of injection ports 124, at least one row may have a different number of total injection ports 124 and/or at least two rows may have a same total number of injection ports 124.

Diameters of the inlets 130 for the injection ports 124 for the rows of injection ports 124 may be the same or different. For example, diameters of the inlets 130 of the first row 126 may be the same or different from the diameters of the inlets 130 of the injection ports 124 for the second row 128. Referring to FIG. 2, a diameter 'DI$_1$' of the inlets 130 of the injection ports 124 of the first row 126 of injection ports 124 is illustrated as being the same as a diameter 'DI$_2$' of the inlets 130 of the injection ports 124 of the second row 128 of injection ports 124. In an alternate embodiment, the diameter 'DI$_1$' of the inlets 130 of the injection ports 124 of the first row 126 is different than a diameter 'DI$_2$' of the inlets 130 of the injection ports 124 of the second row 128. The difference in diameters 'DI$_1$' and 'DI$_2$' can provide a longer injection for the row of injection ports with larger diameter as compared to the row of injection ports with smaller diameter, assuming, of course, the speed of the movable valve 122 is constant. Of course, in one or more embodiments of the disclosed subject matter, even with different diameters of the inlets 130 for different rows, the pulse injections associated with the different rows can be a same duration if the speed of movement of the movable valve 122 is controlled accordingly.

Optionally, the injection ports 124 in any of the first rows of injection ports may have a substantially constant diameter from the inlet 130 to the outlet 132, i.e., between the inner surface 118 and the outer surface 116 of the fuel injector body 112. Alternatively, the injection ports 124 may include other configurations, such as a curved or straight taper with a larger diameter at the outer surface 116 or the inner surface 118 or vice versa. In one example, the diameter 'DI$_2$' of the inlets 130 of the injection ports 124 may be different from a diameter 'DO$_1$' of the outlets 132 of the injection ports 124, for example, convergent or divergent for a desired "K-factor" for cavitation.

The injection ports 124 may be angle in the fuel injector body 112, for instance, at a decline from the inner surface 118 to the outer surface 116 with respect to the horizontal plane of the corresponding injection port 124, or otherwise configured to output fuel from the nozzle region 114 at a predetermined spray angle. In this regard, spray angle can mean the angle at which spray comes out relative to vertical axis of the fuel injector body 112 or nozzle region 114 thereof.

For example, FIG. 2 illustrates the first row 126 of injection ports 124 being angled at an angle 'SA$_1$,' or otherwise configured to output fuel at a first spray angle 'SA$_1$' and the second row 128 of injection ports 124 being angle at an angle 'SA$_2$,' or otherwise configured to output fuel at a second spray angle 'SA$_2$.' Thus, the first row 126 of injection ports 124 may output fuel to the cylinder of the engine at the first spray angle SA$_1$ when aligned (partially or fully) with the fuel output ports 136 of the check valve 122. Likewise, the second row 128 of injection ports 124 may output fuel to the cylinder of the engine at the second spray angle SA$_2$, when aligned (partially or fully) with the fuel output ports 136 of the check valve '122.' The first spray angle 'SA$_1$' and the second spray angle 'SA$_2$' may be the same or different.

The movable valve 122 can include one or more fuel inlet ports or distinct fuel passage portions 134 to receive fuel, and a plurality of fuel output ports 136 to output fuel to one of the first row 126 of injection ports 124 and the second row 128 of injection ports 124. In one or more embodiments of the present disclosure, the fuel output ports 136 of the movable valve 122 are arranged in a same horizontal plane, such as illustrated in FIG. 2.

For example, the fuel output ports 136 of the movable valve 122 may align (fully or partially) with one of the first row 126 of injection ports 124 and the second row 128 of injection ports 124 at any one instant of time, to deliver fuel through the corresponding injection ports 124 of the fuel injector 110. Optionally, a diameter 'd' of the fuel output ports 136 of the movable valve 122 is the same as one or more of the diameter 'DI$_1$' and diameter 'DI$_2$' of the inlets 130 of the first row 126 of injection ports 124 and the second row 128 of injection ports 124, respectively. In one or more other embodiments, the diameter 'd' of the fuel output ports 136 of the movable valve 122 can be different from one or more of the diameters of the inlets 130, for instance, greater than or less than one or more of the diameter '$DI_1$' and diameter '$DI_2$' of the inlets 130 of the first row 126 of injection ports 124 and the second row 128 of injection ports 124, respectively. Optionally, the diameters of the inlets of adjacent rows of injection ports (e.g., rows 126, 128) and/or the distance 'l' are small enough and the diameter 'd' of the fuel output ports 136 of the movable valve is large enough such that fuel from the fuel output ports 136 of the movable valve 122 is simultaneously delivered to both the first and second rows of injection ports 126, 128.

In one example, the fuel output ports 136 of the movable valve 122 may be at different heights or planes, for instance, in different rows. Also, optionally, the fuel output ports 136 in different rows may have distinct fuel supply channels. In operation, such embodiments can be controlled so as to align one set or row of fuel outlet ports 136 with (partially or fully) one set or row of injection ports 124 at a plane, and the movable valve 122 can move so that another set or row of fuel output ports 136 of the movable valve 122 are aligned with (partially or fully) another set of the injection ports 124 at the same plane. In another example, a first set of fuel output ports 136 may be aligned with the first row 126 of injection ports 124, while the second set of fuel output ports 136 below the first set of fuel output ports may be offset from the second row 128 of injection ports 124 and positioned between the first row 126 of injection ports 124 and the second row 128 of injection ports 124. Moving the movable valve 122 downward a relatively short distance can thus align the second set of fuel output ports 136 with the second row 128 of injection ports 124 and offset the first set of fuel output ports 136 from the first row 126 of injection ports 124, so that the fuel is delivered only from the second row 128 of injection ports 124 and no longer from the first row 126 of injection ports 124. As a result, rather than having to move the movable valve 122 all the way down to align the first set of fuel output ports 136 with the second row 128 of injection ports 124, the movable valve 122 can travel a shorter distance.

The movable valve 122 may be mechanically, electrically, hydraulically, and/or pneumatically controlled. For example, the fuel injector 110 may be or have an electro-hydraulic device in which the movable valve 122 can be moved bi-directionally, up and down, in order to align the fuel output ports 136 of the movable valve 122 with one of the first row 126 of injection ports 124 and the second row 128 of injection ports 124 to deliver fuel to the cylinder of the engine, according to a predetermined pulse pattern. In one example, the movable valve 122 may be or have a solenoid or a piezoelectric device that is bi-directionally movable between different positions in the cavity defining the inner volume 120 the fuel injector body 112. Although the present disclosure is described in the context of an electronically-controlled fuel injector, those skilled in the art will appreciate that the disclosure may also be applicable to other types of injectors, such as mechanical fuel injectors, without departing from the scope of the present disclosure.

As noted above, control circuitry 150 can be associated with or part of the fuel injection system 100 to monitor and control operations of the fuel injector 110, the fuel supply system 142, and various other components of the fuel injection system 100. The control circuitry 150 is in signal communication with the fuel injector 110 and the fuel supply system 142, via communication lines 152, and may control fuel pressurization rates and injection patterns for the fuel injector 110, for example. Although a particular embodiment is described, it should be appreciated that the control circuitry 150 may be configured to provide any desired level of control, and may include any number of components and/or devices, such as sensors, useful in providing the desired control.

The control circuitry 150 may be a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. It will be appreciated that other peripheral circuitry such as buffers, latches, switches and so on may be implemented within the control circuitry 150 or separately as desired. Various other circuits may also be associated with the control circuitry 150, such as power supply circuitry, signal conditioning circuitry, solenoid driver circuitry, and other types of circuitry. Further it may be understood that the control circuitry 150 may be associated with a software product stored on a non-transitory computer readable memory (not shown) and comprising data and computer implementable instructions. The non-transitory computer readable medium may include a memory, such as RAM, ROM, a flash memory, a hard drive, etc. The computer readable memory may also be configured to store electronic data associated with operation of the fuel injection system 100.

As noted above, the fuel injection system 100 according to various embodiments of the present disclosure can provide pulsed injections (timed injections) according to any of a plurality of predetermined pulse injection patterns where fuel is delivered in bursts to coincide with an induction stroke of the cylinder in the engine. The control circuitry 150 may include hardware and/or software, as noted above, for instance, to control operation of the fuel injection system 100 by varying timing and duration of electric pulse applied to the fuel injector 110 according to any of a plurality of predetermined pulse injection patterns. It may be understood that the fuel injection operation, i.e., the particular predetermined pulse injection pattern, may be defined by a timing (advance angle before Top Dead Center (TDC) of piston in the cylinder), and a fuel quantity delivered per stroke (milliliters of fuel/stroke). In particular, the movable valve 122 can move in the inner volume 120 in response to a signal from the control circuitry 150. The signal from the control circuitry 150 may include an electric pulse having a prescribed duration (or width), ending with an end of current (EOC). Upon receiving the electric pulse from the control circuitry 150, the check valve 122 may move upward or downward to align or misalign the fuel output ports 136 with the injection ports 124.

The control circuitry 150 can determine time duration of alignment (full or partial) of the fuel output ports 136 of the movable valve 122 with the injection ports 124 in the fuel injector body 112, for delivery of the fuel. Further, the control circuitry 150 may synchronize the start of the electric pulse to the fuel injector 110 to initiate fuel injection at a desired piston location. The control circuitry 150 may also determine a required fuel quantity based on engine operating parameters, such as throttle position and engine speed. Further, in one or more embodiments, the control circuitry 150 may adjust the pressure of the fuel supplied to the fuel injector 110, by regulating fuel from the fuel supply system 142, based on the total number and/or the diameters '$DI_1$,' '$DI_2$' of the injection ports 124 in the corresponding rows. Based on the required fuel quantity and rail pressure, the control circuitry 150 may calculate the pulse pattern to be output by the fuel injector 110. In some embodiments, such relation may be recorded as a map in a memory (not shown) of the control circuitry 150, and the control circuitry 150 may determine the pulse pattern based, at least in part, on this predetermined map during responsive to engine operation, for instance.

Referring to FIGS. 2-6, the movable valve 122 in the fuel injector 110 is shown to be movable between five discrete positions in the inner volume 120 of the fuel injector body 112, or specifically in the nozzle region 114 of the fuel injector body 112, though embodiments of the disclosed subject matter are not limited to five positions, let alone five discrete positions. The positions are labeled first position 'A,' second position 'B,' third position 'C,' fourth position 'D,' and fifth position 'E.' Of course, the positions are merely examples and non-limiting and other positions, static or dynamic, are encompassed by the present disclosure and embodiments thereof.

In the first position 'A,' as illustrated in FIG. 2, the fuel output ports 136 of the movable valve 122 are above the first row 126 of injection ports 124 and no fuel is output from the injection ports 124 of the fuel injector body 112.

Figure 3:
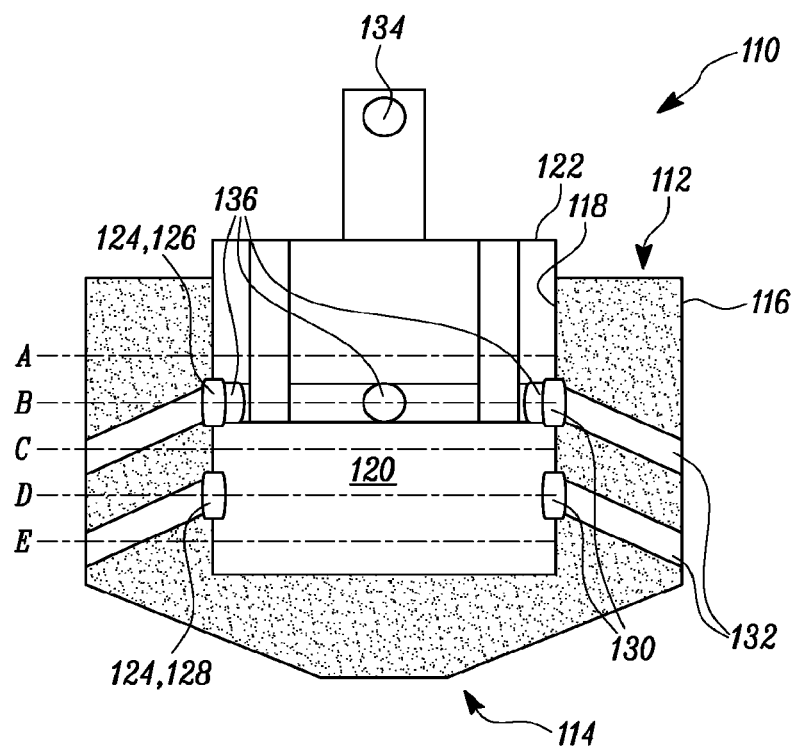
FIG. 3 illustrates a diagrammatic sectional view of the portion of the fuel injector of FIG. 2 with the movable valve at a second position, in accordance with one or more embodiments of the present disclosure.

To reach the second position 'B,' as illustrated in FIG. 3, the movable valve 122 is moved downward such that the fuel output ports 136 of the movable valve 122 are aligned with the first row 126 of injection ports 124, and fuel from the movable valve 122 is delivered to the first row 126 of injection ports 124 such that fuel is output from the outlets 132 at a first spray angle '$SA_1$' (and not from the second row 128 of injection ports 124). At this point, the movable valve 122 may be moved upward, for instance, to the first position, or downward to the third position 'C' discussed below.

Figure 4:
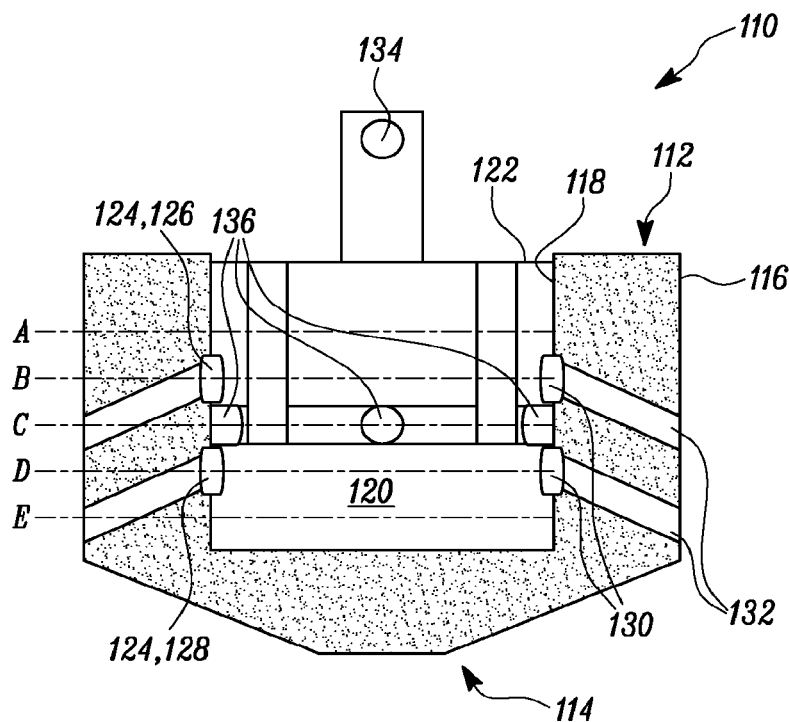
FIG. 4 illustrates a diagrammatic sectional view of the portion of the fuel injector of FIG. 2 with the movable valve at a third position, in accordance with one or more embodiments of the present disclosure.

To reach the third position 'C,' as illustrated in FIG. 4, the movable valve 122 is moved downward such that the fuel output ports 136 of the movable valve 122 are between (i.e., misaligned) the first row 126 of injection ports 124 and the second row 128 of injection ports 124 and no fuel is output from the injection ports 124 of the fuel injector body 112. At this point, the movable valve 122 may be moved upward, for instance, to the second position, or downward to the fourth position 'D' discussed below.

Figure 5:
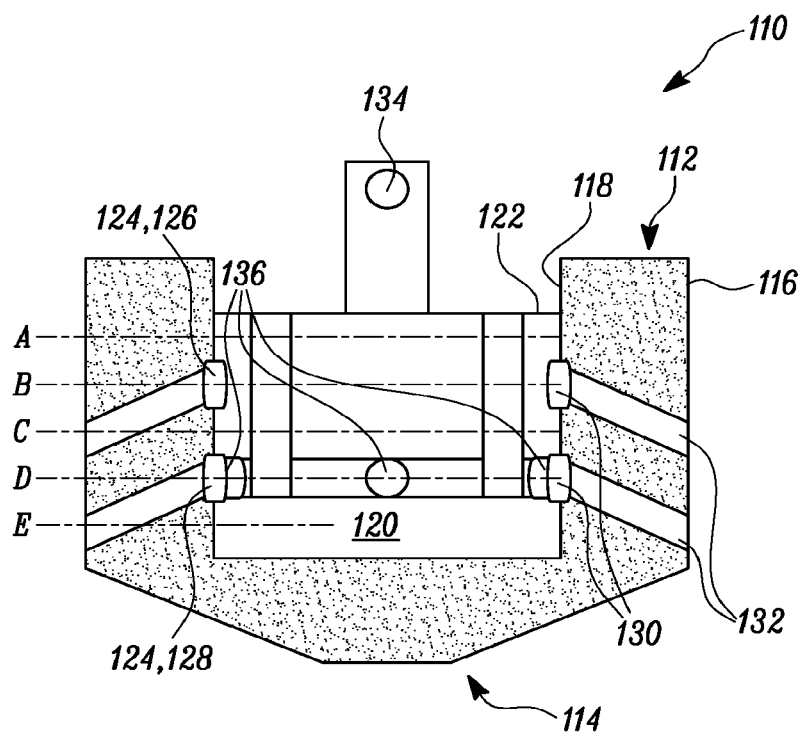
FIG. 5 illustrates a diagrammatic sectional view of the portion of the fuel injector of FIG. 2 with the movable valve at a fourth position, in accordance with one or more embodiments of the present disclosure.

To reach the fourth position 'D,' as illustrated in FIG. 5, the movable valve 122 is moved downward such that the fuel output ports 136 of the movable valve 122 are aligned with the injection ports 124 of the second row 128 of injection ports 124, and fuel from the movable valve 122 is delivered to the second row 128 of injection ports 124 such that fuel is output from the outlets 132 at a second spray angle '$SA_2$.' At this point, the movable valve 122 may be moved upward, for instance, to the third position, or downward to a fifth position 'E' discussed below.

Figure 6:
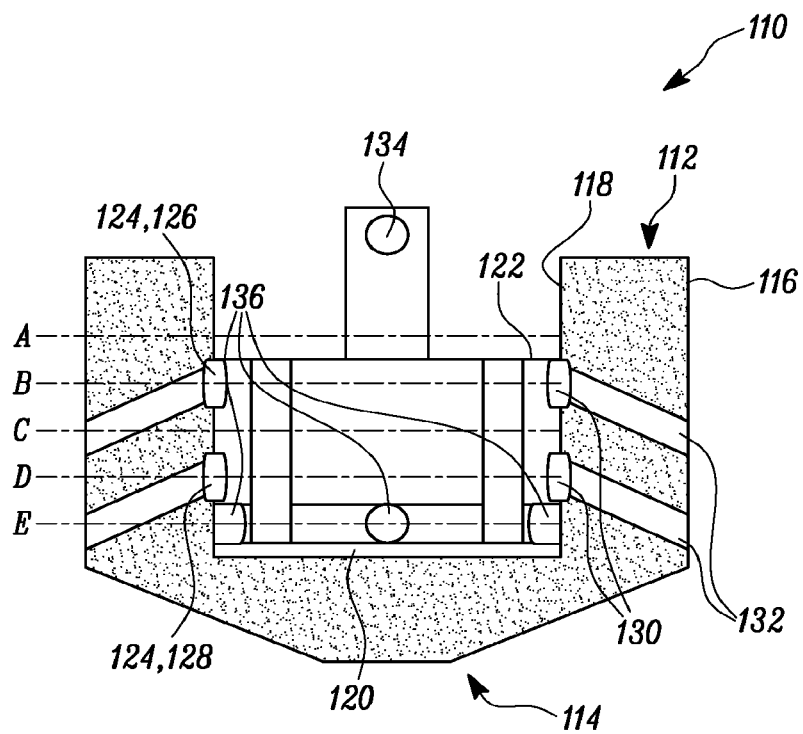
FIG. 6 illustrates a diagrammatic sectional view of the portion of the fuel injector of FIG. 2 with the movable valve at a fifth position, in accordance with one or more embodiments of the present disclosure.

To reach the fifth position 'E,' as illustrated in FIG. 6, the movable valve 122 is moved downward such that the fuel output ports 136 of the movable valve 122 are below the second row 128 of injection ports 124 of the fuel injector body 112 and no fuel is output from the injection ports 124 of the fuel injector body 112.

Thus, in a single predetermined fuel injection cycle, which may be defined as from a start of injection (SOI) to an end of injection (EOI), and, optionally, may occur within the time from the SOI to the end of combustion, the movable valve 122 can move downward from the first position 'A' in the inner volume 120, which may be an initial or starting position, to the second position 'B' to output fuel at the first spray angle '$SA_1$' from the outlets 132 of the first row 126 of injection ports 124. Subsequently, the movable valve 122 can move, during the single fuel injection cycle, from the second position 'B' either upward in the inner volume 120 to the first position 'A' or downward in the inner volume 120 to the third position 'C' where no fuel is output. Further, the movable valve 122 can move downward, during the single fuel injection cycle, from the third position 'C,' in the inner volume 120, to the fourth position 'D' to output fuel from the second row 128 of injection ports 124. Alternatively, the movable valve 122 can move back to the second position 'B' to output fuel again from the second row 126 of injection ports 124. Optionally, the movable valve 122 can move downward, during the single fuel injection cycle, from the fourth position 'D,' in the inner volume 120, to the fifth position 'E,' which may be a final position, where no fuel is output.

In one embodiment, the movable valve 122 in the second position 'B' and the fourth position 'D' can provide a partial alignment of the fuel output ports 136 of the movable valve 122 with the first row 126 of injection ports 124 and the second row 128 of injection ports 124 of the fuel injector body 112, respectively.

According to an embodiment of the present disclosure, the movable valve 122 is controllable to move bi-directionally to and between the first position 'A,' the second position 'B,' the third position 'C,' the fourth position 'D,' and the fifth position 'E' during the single fuel injection cycle (and successive or alternating cycles subsequent cycles).

Further, in one or more embodiments of the disclosed subject matter, a speed 'S' of the movable valve 122 can be modified or varied (including stopped), for instance, as it moves in the inner volume 120 to and between the first position 'A,' the second position 'B,' the third position 'C,' the fourth position 'D,' and the fifth position 'E,' for instance, to create a predetermined pattern of pulse injections with pre-defined pulse duration, rate shape, and intervals between pulses. Specifically, the movable bi-directional valve 122 can be controllable such that the speed 'S' of the movable valve 122 changes from a first speed to a second speed after initial alignment of the fuel output ports 136 of the movable valve 122 with one of the first row 126 of injection ports 124 and the second row 128 of injection ports 124. Such change in speed can create a predefined fuel pulse pattern of a desired duration. It may be contemplated that the control circuitry 150 is configured to control the speed 'S' of the movable bi-directional valve 122 from the first speed to the second speed during movement of the movable valve 122 in the fuel injector body 112 to and between the various positions 'A,' 'B,' 'C,' 'D,' and 'E.'

In one example, movement of the movable bi-directional valve 122 at the first speed is in a first direction, and movement of the bi-movable directional valve 122 at the second speed is in a second direction opposite the first direction. In one example, movement of the movable bi-directional valve 122 from the first speed to the second speed occurs upon the initial alignment of the plurality of fuel output ports 136 of the movable valve 122 with one of the first row 126 of injection ports 124 and the second row 128 of injection ports 124, of the fuel injector body 112. In another example, movement of the movable bi-directional valve 122 from the first speed to the second speed occurs prior to the initial alignment of the plurality of fuel output ports 136 of the movable valve 122 with one of the first row 126 of injection ports 124 and the second row 128 of injection ports 124, of the fuel injector body 112. Further, in one embodiment, one or both of the first speed and the second speed of the movable valve 122 are non-zero.

Figure 7A:
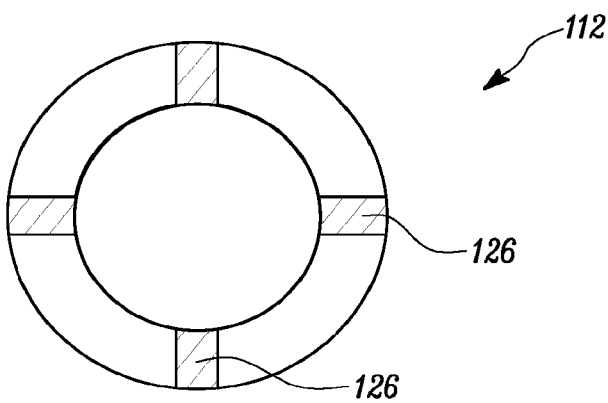
FIGS. 7A-7C illustrate diagrammatic overhead sectional views of a fuel injector body of the fuel injector of FIG. 2, in accordance with one or more embodiments of the present disclosure.
Figure 7B:
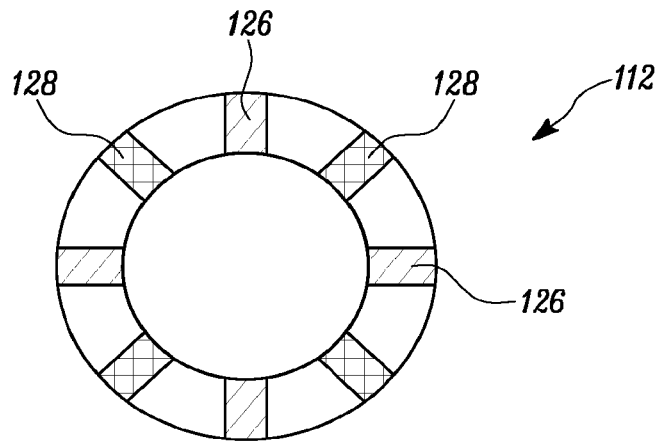
Figure 7C:
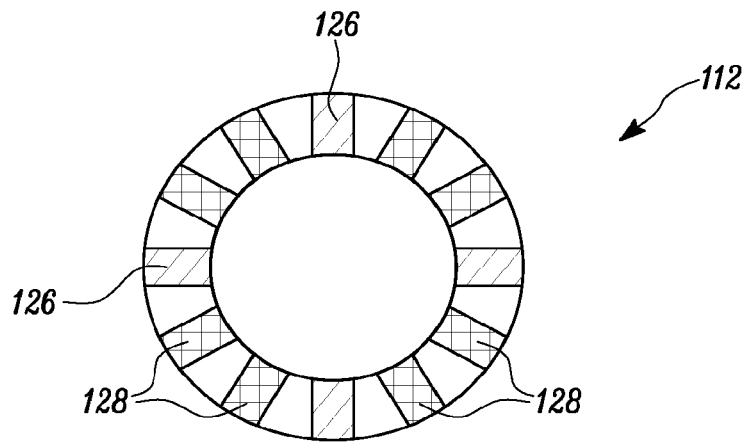

FIGS. 7A-7C illustrate diagrammatic overhead sectional see-through views of the fuel injector body 112 with injector ports 124. It may be understood from the illustrated overhead views that at least one of the injection ports 124 of the first row 126 of injection ports 124 can be offset from and does not overlap with any of the injection ports 124 of the second row 128 of injection ports 124. That is, the injection ports 124 of different planes or rows 126, 128 may be aligned or staggered, partially or fully. FIGS. 7A-7C illustrate examples of overlapping (aligned) and non-overlapping (staggered) arrangements of the injection ports 124 of the fuel injector body 112.

In FIG. 7A, the first row 126 of injection ports 124 includes a total of four injection ports which overlap with four or less injection ports 124 in the second row 128 of injection ports 124.

In FIG. 7B, the first row 126 of injection ports 124 is again shown to include a total of four number of injection ports, and the second row 128 of injection ports 124 includes at least four injection ports 124 (as shown). Of course, one or more additional injection ports of the second row 128 may be provided directly under the injection ports of the first row 126 (and thus, not expressly viewable in FIG. 7B).

In FIG. 7C, the first row 126 of injection ports 124 may include a total of four injection ports 124, and the second row 128 of injection ports 124 may include at least eight injection ports 124 (as shown). Of course, one or more additional injection ports of the second row 128 may be provided directly under the injection ports of the first row 126 (and thus, not expressly viewable in FIG. 7C).

FIGS. 8A-8H illustrate non-limiting examples of different predetermined fuel injection patterns according to one or more embodiments of the disclosed subject matter. In general, the graphs of FIGS. 8A-8H represent the rate and shape of the fuel injection patterns in a single predetermined fuel injection cycle, with the Y-axis representing an amount of fuel output by the fuel injector 110 or individual injection ports 124, and the X-axis represents time, particularly the pulse duration and time interval between pulses. Each of the graphs represent a predetermined pulse injection pattern from a single predetermined fuel injection cycle as described herein. Further, the legends 'A,' 'B,' 'C,' 'D,' and 'E' represent the positions of the movable valve 122 during the single predetermined fuel injection cycle at the first position, the second position, the third position, the fourth position, and the final position, respectively, relative to FIGS. 2-6. In this regard, it is understood that fuel is output at the second position 'B' and the fourth position 'D.' Conversely, there is no fuel output at the first position 'A,' the third position 'C,' and the fifth position 'E.'

Figure 8A:
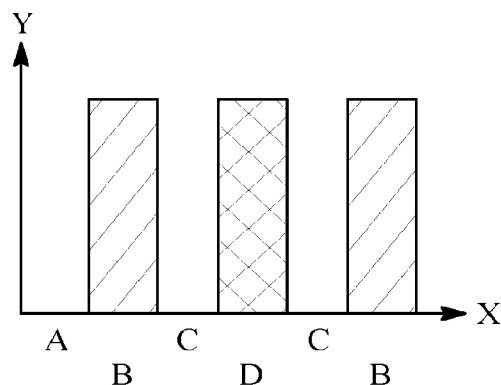
FIGS. 8A-8H illustrate graphs of non-limiting examples of fuel injection patterns generated by the fuel injection system of FIG. 1, in accordance with one or more embodiments of the present disclosure.
Figure 8B:
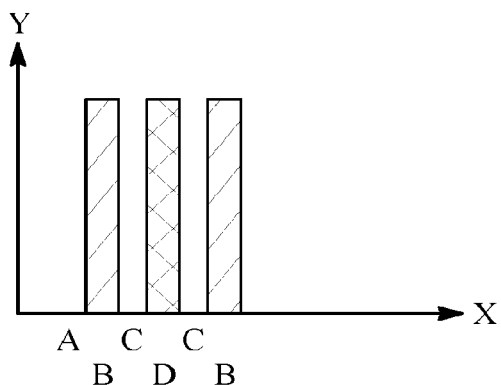
Figure 8C:
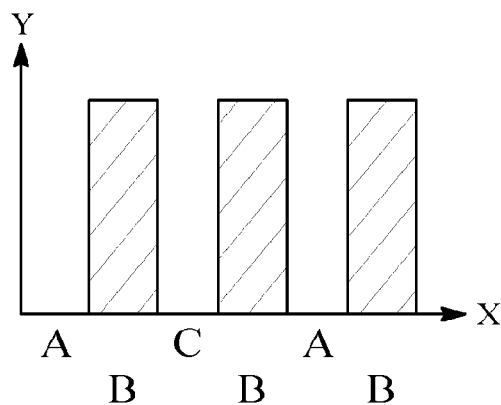
Figure 8D:
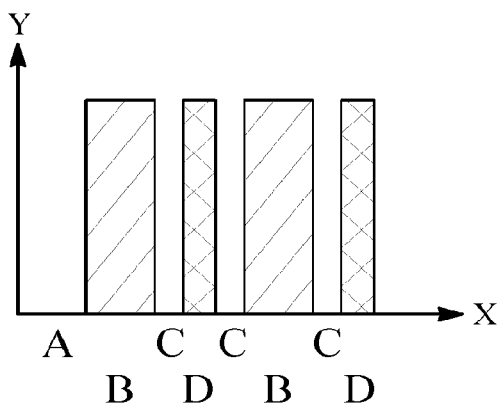
Figure 8E:
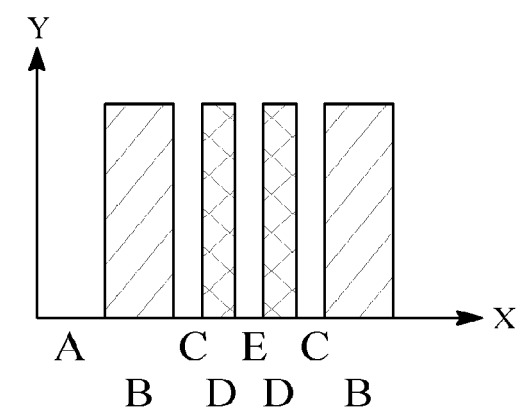
Figure 8F:
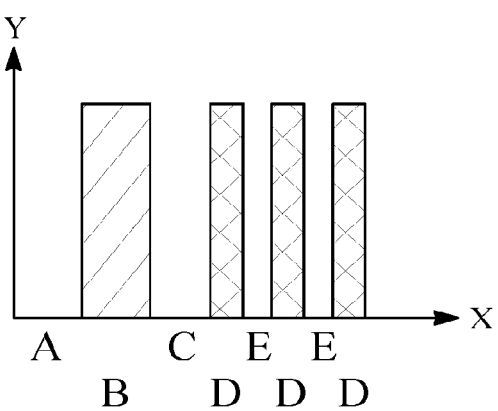
Figure 8G:
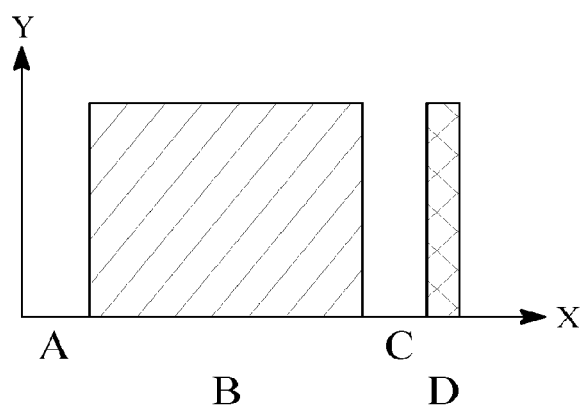
Figure 8H:
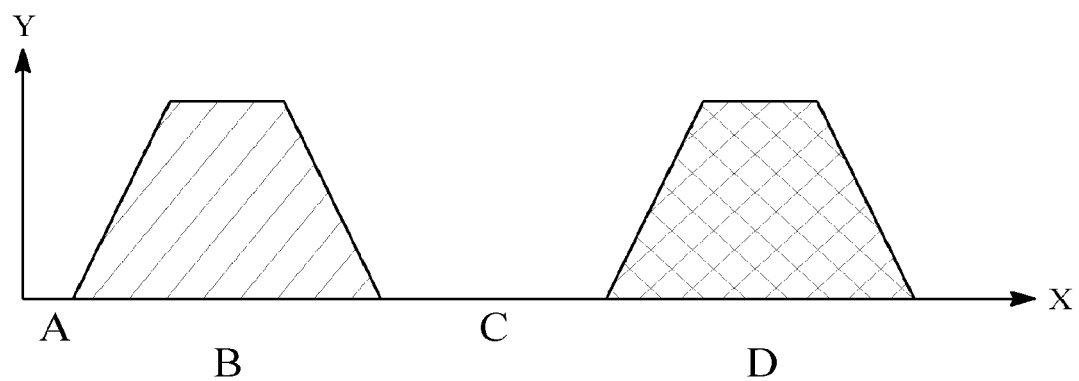

In particular, FIGS. 8A-8G show exemplary "square" injection patterns of various pulse durations and intervals there between, while FIG. 8H shows an exemplary ramp injection pattern for the fuel injection. It may be understood that square injection patterns can be generated when the movable valve 122 is moved such that fuel output ports 136 thereof are in alignment with a particular injection port or ports 124 and held in place at alignment until the predetermined time period at which the square pulse is to end. A ramp injection pattern may be generated by changing the rate at which the movable valve 122 is moved, i.e., moved slow at first to create "ramp," held to create flat plateau, and moved slow again (could be in either direction depending upon whether same or different injection ports 124 are to be used for injecting fuel next) to create down-going ramp. The types of pulses (i.e., rate shapes) and specific injection patterns shown in FIGS. 8A-8G are exemplary only, are not intended to be limiting, and may not exactly correspond to actual fuel injection patterns or rate shapes. For example, other injection pulses may be implemented, such as a boot injection pattern shape.

INDUSTRIAL APPLICABILITY

The present disclosure, directed to fuel injectors, can provide any of a plurality of predetermined pulse injection patterns by controlling speed and direction of movable valve in the fuel injector body, to output or inject fuel according to the predetermined pulse injection patterns. Selectively applying predetermined fuel injection patterns can optimize fuel consumption and emissions.

According to one or more embodiments of the disclosed subject matter, a method of injecting fuel during a single predetermined fuel injection cycle according to any one of a plurality of predefined pulse injection patterns is provided.

Generally speaking, the method can include providing the fuel injector body 112 and the movable valve 122, in which the fuel injector body 112 has a plurality of different rows of openings, for instance, the first set or row 126 of openings or ports 126 and the second set or row 128 of openings or ports 124, and the movable valve 122 has a plurality of the fuel output ports 136 to output fuel to the openings or ports 124 of the fuel injector body 112.

The method can also include moving the movable valve 122 relative to the fuel injector body 112 up and down in the single fuel injection cycle, and optionally at different speeds, to selectively inject fuel from one or more of the first set 126 of openings 124 and the second set 128 of openings 124 in correspondence with a first predefined pulse injection pattern of a plurality of predefined pulse injection patterns. As discussed above, the predefined patterns include, but are not limited to, one or more pulses of square, rectangle, ramp and boot shape.

The method can further include moving the movable valve 122 relative to the fuel injector body 112 up and down in a second single predetermined fuel injection cycle subsequent to the single fuel injection cycle of said first predefined pulse injection pattern, and optionally at different speeds. Optionally, the second injection cycle may be immediately after the first injection cycle. During the second injection cycle, the movable valve 122 can be moved to selectively inject fuel from one or more of the first set 126 of openings 124 and the second set 128 of openings 124 in correspondence with a second predefined pulse injection pattern of the plurality of predefined pulse injection patterns different from the first predetermined pulse injection pattern. In one embodiment, the movement of the movable valve 122 in correspondence with the first predefined pulse injection pattern selectively injects fuel from only one of the first set 126 of openings and the second set 128 of openings 124. Alternatively, movement of the movable valve 122 is in correspondence with the first predefined pulse injection pattern to selectively inject fuel from both the first and second sets of openings 126, 128. In one example, movement of the movable valve 122 at different speeds is responsive to some or all of the fuel output ports 136 of the movable valve 122 becoming aligned, at least partially, with some or all of the openings of one of the first set of openings 126 and the second set of openings 128.

Figure 9:
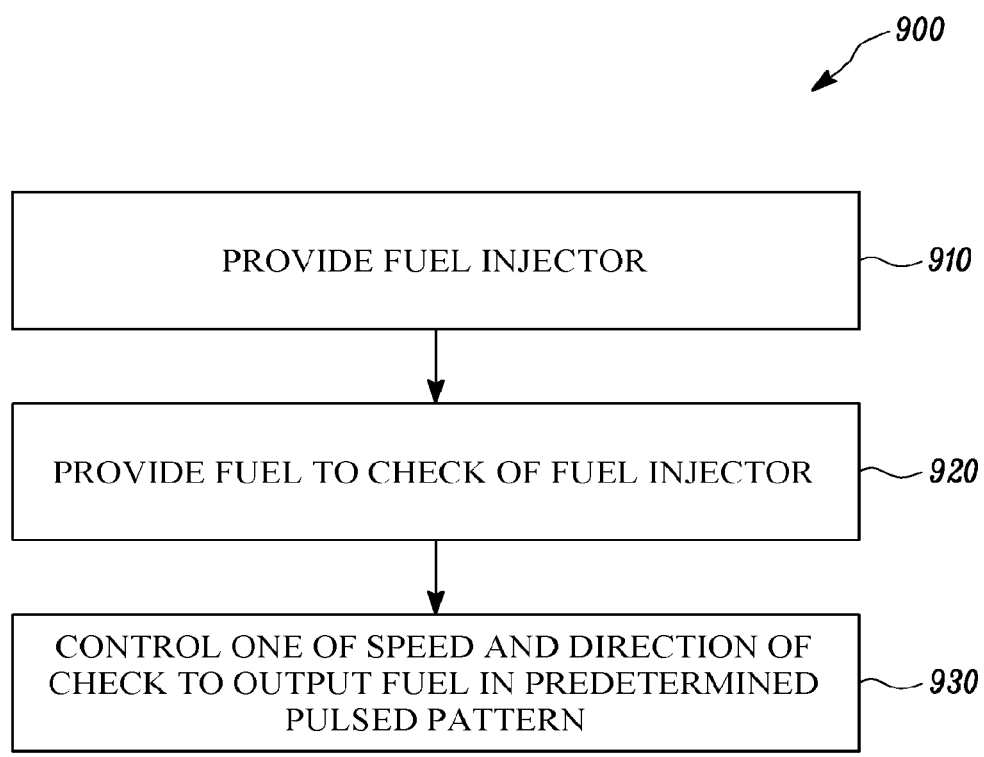
FIG. 9 is flow chart of a method according to one or more embodiments of the present disclosure.

FIG. 9 illustrates a process or method 900 depicting steps according to one or more embodiments of the disclosed subject matter to inject fuel from a fuel injector during a single predetermined fuel injection cycle according to any one of a plurality of predefined pulse injection patterns.

As illustrated, at step 910, the process 900 can include providing a fuel injector or fuel injector system, such as fuel injector 110 and fuel injection system 100, respectively. As noted above, the fuel injector can include rows of injection ports, and the bi-directional movable valve 122 can selectively align fuel output ports 136 with the rows of injection ports in a single predetermined fuel injection cycle.

At step 920, the process 900 includes providing fuel to the movable valve, which, generally speaking, involves regulating a fuel pump and other components of the fuel injection system using control circuitry, for instance, to supply fuel to one or more fuel inlet ports of the movable valve.

At step 930, the process 900 includes controlling the speed 'S,' direction of the movable valve, and positioning of the movable valve to output fuel according to a predetermined pulsed pattern, such as the patterns discussed above.

Thus, embodiments of the present disclosure can provide the fuel injection system 100 and the process 900 of controlling the fuel injector 110 to provide any of a plurality of predetermined, defined and repeatable pulse injection patterns.

The system and the method of the present disclosure can achieve infinite varieties of fuel injection patterns, since one or more of the number of rows of injection ports 124, the diameter of injection ports 124, the distance between rows 'I,' the speed of valve movement 'S,' and the spray angles '$SA_1$' and '$SA_2$' may be varied. Therefore, the present disclosure provides flexibility in changing the pulse injection pattern, for instance, based on or in accordance with varying operating conditions of the engine. Further, present system and the method can also provide multiple injection capabilities, if needed, depending upon the injection strategy employed by the engine or particular type of engine. Such variety of well-defined and repeated pulse injection patterns in shorter durations, as achieved by the fuel injector 110 of the present disclosure, can result in many benefits, including optimizing emissions and fuel consumption.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fuel injector comprising:
   a fuel injector body defining an inner volume and having a plurality of rows of injection ports, including a first row of injection ports and a second row of injection ports below the first row of injection ports, each of the injection ports having an inlet and an outlet; and
   a check valve having a one or more fuel inlet ports to receive fuel, and a plurality of fuel output ports to output fuel to one of the first row of injection ports and the second row of injection ports, the fuel output ports of the check valve being arranged at a same horizontal plane,
   wherein the check valve is configured to move, during a single predetermined fuel injection cycle, from an initial position in the inner volume where fuel output ports of the check valve are above the first row of injection ports of the fuel injector body and no fuel is output from the injection ports of the fuel injector body, downward in the inner volume to a second position where the injection ports of the first row are aligned with the output ports of the check valve such that fuel from the check valve is output at a first spray angle from the outlets of the injection ports of the first row of injection ports,
   wherein the check valve is configured to move, during the single predetermined fuel injection cycle, from the second position either upward in the inner volume to the initial position or downward in the inner volume to a third position where the fuel output ports of the check valve are between the first and second rows of injection ports of the fuel injector body and no fuel is output from the injection ports of the fuel injector body,
   wherein the check valve is configured to move, during the single predetermined fuel injection cycle, from the third position downward in the inner volume to a fourth position where the fuel output ports of the check valve are aligned with the injection ports of the second row of injection ports such that fuel from the check valve is output at a second spray angle from the outlets of the injection ports of the second row of injection ports,
   wherein the check valve is controllable to move at least between the initial position, the second position, the third position, and the fourth position bi-directionally during the single predetermined fuel injection cycle, and
   wherein speed of the check valve is variable between at least the initial position, the second position, the third position, and the fourth position to create a predetermined pattern of pulse injections with pre-defined pulse duration, rate shape, and intervals between pulses.

2. The fuel injector according to claim 1, where the first and second spray angles are different.

3. The fuel injector according to claim 1, wherein a total number of injection ports of the first row is the same as a total number of injection ports of the second row.

4. The fuel injector according to claim 1, wherein a total number of injection ports of the first row is different than a total number of injection ports of the second row.

5. The fuel injector according to claim 1, wherein a diameter of the injection ports of the first row is the same as a diameter of the injection ports of the second row.

6. The fuel injector according to claim 1, wherein a diameter of the fuel output ports of the check valve is the same as one or more of a diameter of the outlets of the first row of injection ports and a diameter of the outlets of the second row of injection ports.

7. The fuel injector according to claim 1, wherein, in an overhead view, at least one of the injection ports of the plurality of injection ports of the first row is offset from and does not overlap any of the injection ports of the second row of injection ports.

8. The fuel injector according to claim 1, wherein the plurality of rows of the injection ports includes a third row of injection ports below the second row of injection ports, the injection ports of the third row being configured to output fuel at a third spray angle.

9. The fuel injector according to claim 1, wherein the second position includes a partial alignment of the injection ports of the first row with the output ports of the check valve.

* * * * *